W. T. McCULLOUGH.

SIGNALING TORPEDO.

APPLICATION FILED MAR. 3, 1921.

Reissued May 10, 1921. 15,101.

*Witnesses:*

Ethan Frost

Lois Wrieman.

*Inventor:*

W. T. McCullough by W. G. Woolcott

Attorney

UNITED STATES PATENT OFFICE.

WILLIAM T. McCULLOUGH, OF PITTSBURGH, PENNSYLVANIA, ASSIGNOR OF ONE-HALF TO HENRY J. ORTH, OF PITTSBURGH, PENNSYLVANIA.

SIGNALING-TORPEDO.

15,101. Specification of Reissued Letters Patent. Reissued May 10, 1921.

Original No. 1,337,240, dated April 20, 1920, Serial No. 219,222, filed February 26, 1918. Application for reissue filed March 3, 1921. Serial No. 449,533.

*To all whom it may concern:*

Be it known that I, WILLIAM T. McCULLOUGH, a citizen of the United States, residing at Pittsburgh, in the county of Allegheny and State of Pennsylvania, have invented certain new and useful Improvements in Signaling-Torpedoes, of which the following is a specification.

This invention relates to signaling torpedoes, and particularly to that type of torpedoes employed on railroad tracks for the purpose of signaling train crews.

An object of the invention is to provide a torpedo for this purpose having means thereon adapted to be engaged by the wheel in advance of the explosive charge and thereby hold the torpedo in place and prevent the wheel from shifting the explosive charge to a position where it will not be discharged.

A further object of the invention is to provide a method by which the torpedo may be easily and cheaply made, with a minimum waste of material, the torpedo having few parts which can be quickly and cheaply formed and assembled.

In the drawings, which illustrate my invention,

Figure 1:
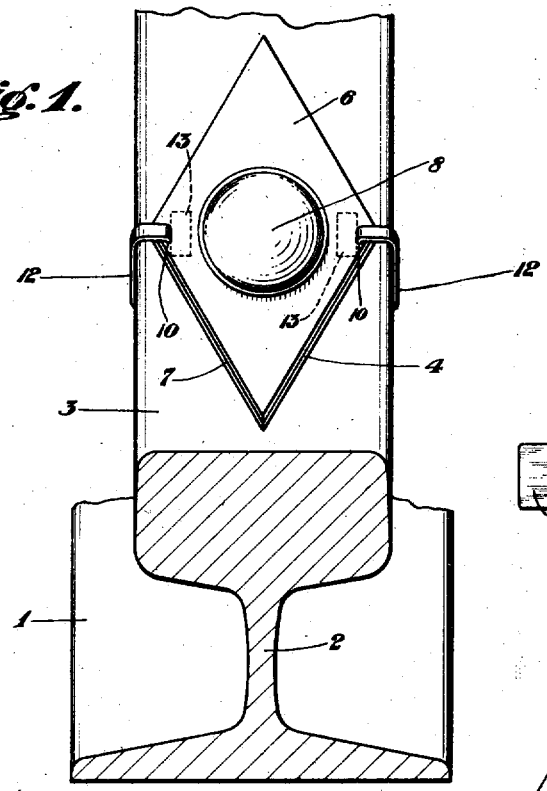
Figure 1 is an isometric view of a track rail showing a torpedo constructed in accordance with my invention applied thereto.
Figure 3:
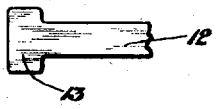
Fig. 3 is a broken detail of a retaining strip.

Referring to the drawings, 1 denotes the base of a rail; 2 the web; and 3 the head of the rail.

Figure 4:
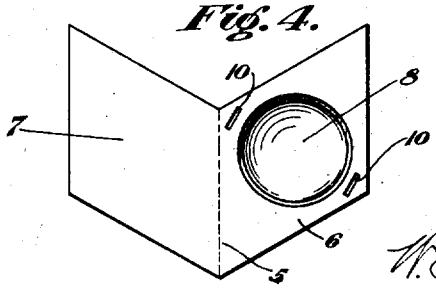
Fig. 4 is an elevation of the blank from which the torpedo is formed.

The torpedo body is in the form of a parallelogram, preferably diamond shaped, as shown, and it is preferably formed of a blank or single piece of material 5. I prefer that the body be made of moisture proof fibrous material, though any suitable material can be used. The blank, shown in Fig. 4, is in the form of two diamond shaped parallelograms 6 and 7, having a common side, and of the same size. The shape of the blank is such that when it is bent along the common side, indicated by the dotted line in Fig. 4, section or part 6 will lie over part 7, and the sides of 6 will coincide with the corresponding sides of 7. Blanks of this shape can be readily formed from sheets or strips of material, with a minimum waste.

A pocket 8 is provided in the member 6, which pocket may be formed with a seat 9 around its periphery. The member 6 may also be provided with slots 10 near the edge thereof for the purpose hereinafter described.

After the blank has been formed, as shown in Fig. 4, an explosive charge is placed in the pocket 8, and when a seat 9 is provided, a retaining disk 11 is seated therein. Rail engaging strips 12 are then preferably passed through slots 10, these strips being formed of soft metal or other suitable material, and have transversely extending head portions 13 to prevent the retaining strips from pulling out.

After the charge has been placed in the pocket 8, and the retaining strips 12, when of the kind just described are employed, are properly positioned, the blank is folded along the common side, indicated in dotted lines in Fig. 4, so that part 6 is superimposed over part 7, the edges of the adjacent faces being coated with a moisture proof sealing medium, such as sealing wax or paraffin. When folded and sealed, part 6 of the body is over part 7, and part 7 forms the means for preventing displacement of the charge and of the disk 11, while the outside of pocket 8 forms a convex projection on the top of the torpedo. The body of the torpedo is diamond shaped, as shown in Fig. 1, and is preferably longer than it is wide. The rail engaging strips 12 are bent downwardly to engage the sides of the rail head 3.

By reference to Fig. 1, it will be seen that by reason of the diamond shape, the pointed end sections extend in advance of the explosive charge, and, being relatively flat, they are not liable to be slid or pushed to one side so that the wheel will ride over them. When the wheel is on the pointed extensions, the body of the torpedo will be clamped to the rail, and the explosive charge will be held against displacement by the wheel.

Figure 5:
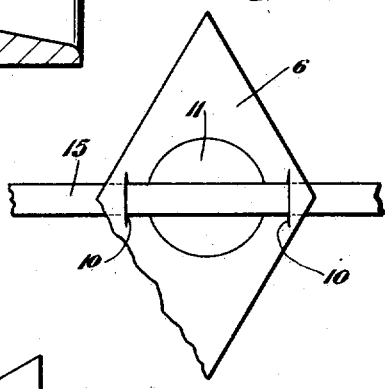
Fig. 5 is a bottom plan view of the blank, part of it being broken away, showing a modified arrangement of the retaining strip for engaging the rail.
Figure 2:
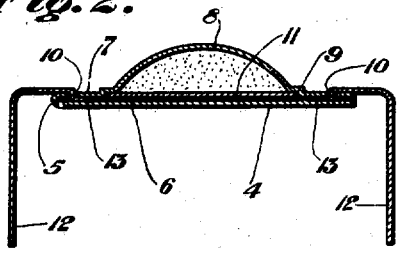
Fig. 2 is a cross sectional view of a torpedo of the form shown in Fig. 1.

In the modification shown in Fig. 5, the construction of the body of the torpedo is similar to that described, but a continuous strip 15 forms the retaining means, and the necessity for forming heads on the strips is avoided.

The fibrous body may be rendered impervious to moisture throughout, and covered with a coating which will, render it easily visible when placed on a track.

By forming the body of two superimposed parallelograms of substantially the same area, a simple means of holding the explosive charge in place is provided, and the bottom or rail engaging face of the torpedo is free of undesirable projections. By having the upper and lower members in the shape of a diamond, the blanks can be cut from strip material with a minimum of waste, and the torpedo is formed with the forwardly extending pointed portions for engagement by the wheel. Furthermore, by providing a single blank having the two parts formed integrally, the blanks can be easily formed, and, upon folding, they may be readily superimposed in proper position and sealed. Because the retaining strips 12 are secured in slots in the top of the upper part 6, they do not pass through the sides where the edges are sealed together, tending to loosen the sealing material and to pull out.

I claim as my invention:

1. A torpedo comprising an integral body formed of two superimposed parts in the form of diamond-shaped parallelograms whereby pointed end portions beyond the explosive charge are provided, one of said parts having a pocket formed therein, and an explosive charge in the pocket and between the two parts, the other part forming the bottom portion of the body.

2. A torpedo comprising a fibrous body formed of superimposed parts in the form of diamond-shaped parallelograms, one of said parts having a pocket formed therein, an explosive charge in the pocket and between the two parts, the other part forming the bottom portion of the body, and waterproof sealing material holding the parts together.

3. A torpedo comprising a body consisting of a single piece of material folded upon itself to provide upper and lower parts and formed to give the body a diamond shape, an explosive charge positioned between the upper and lower parts, said upper and lower parts being sealed together.

4. A torpedo comprising a body consisting of a single piece of material folded upon itself to provide upper and lower parts and formed to give the body a diamond shape, an explosive charge positioned between the upper and lower parts, said upper member having openings therein near the edge thereof, a rail engaging means passing through each of the openings, and sealing means holding the upper and lower parts together.

5. A signaling torpedo comprising a carrier formed of an inner and an outer section, said outer section provided with a pocket, and an explosive charge in said pocket, one of said sections formed integral with the other, and a disk carried by one of said sections closing said pocket.

6. A signaling torpedo comprising a carrier formed of an inner and outer section, said outer section provided with a pocket, and an explosive charge in said pocket, one of said sections formed integral with the other, a disk carried by one of said sections closing said pocket, and means connected to one of said sections for retaining said carrier in position on the trackrail.

7. A signaling torpedo comprising a carrier formed of an inner and outer section, said outer section provided with a pocket, and an explosive charge in said pocket, one of said sections formed integral with the other, and means connected to the outer of said sections for retaining said carrier in position upon the trackrail.

8. The method of making torpedoes which consists in forming a blank in the form of two diamond-shaped parallelograms having a common side, folding one parallelogram over the other along the common side, inclosing an explosive charge therebetween, and sealing the edges of the adjacent faces.

9. The method of making diamond-shaped torpedoes which consists in forming a blank of a single piece of material in the form of two diamond shaped parallelograms having a side common to both, providing a pocket in one of the parallelograms, placing an explosive charge in said pocket, folding one of the parallelograms over the other along the common side to inclose the explosive charge, and sealing the edges of the adjacent faces of the parallelograms.

In testimony whereof I have hereunto set my hand this 8th day of February, 1921.

WILLIAM T. McCULLOUGH.

Witnesses:

HENRY J. ORTH,
LOIS WINEMAN.